(12) United States Patent
Hennessey et al.

(10) Patent No.: US 9,619,950 B2
(45) Date of Patent: Apr. 11, 2017

(54) METHOD AND DEVICE FOR PROVIDING DRIVER FEEDBACK

(71) Applicant: Jaguar Land Rover Limited, Coventry (GB)

(72) Inventors: Giles Hennessey, Coventry (GB); Jose Serras-Pereira, Coventry (GB); Andrew Gardiner, Coventry (GB); Duncan Robertson, Coventry (GB); David Smith, Coventry (GB); Mehul Shewakramani, Coventry (GB)

(73) Assignee: Jaguar Land Rover Limited (GB)

( * ) Notice: Subject to any disclaimer, the term of this patent is extended or adjusted under 35 U.S.C. 154(b) by 29 days.

(21) Appl. No.: 14/370,420

(22) PCT Filed: Jan. 8, 2013

(86) PCT No.: PCT/EP2013/050218
§ 371 (c)(1),
(2) Date: Jul. 2, 2014

(87) PCT Pub. No.: WO2013/104621
PCT Pub. Date: Jul. 18, 2013

(65) Prior Publication Data
US 2014/0340211 A1    Nov. 20, 2014

(30) Foreign Application Priority Data

Jan. 9, 2012    (GB) .................................. 1200283.8

(51) Int. Cl.
*B60Q 1/00*    (2006.01)
*G07C 5/08*    (2006.01)
(Continued)

(52) U.S. Cl.
CPC .......... *G07C 5/085* (2013.01); *B60R 16/0236* (2013.01); *B60W 50/14* (2013.01);
(Continued)

(58) Field of Classification Search
None
See application file for complete search history.

(56) References Cited

U.S. PATENT DOCUMENTS

| 5,284,116 A * | 2/1994 | Richeson, Jr. .......... F02B 75/02 |
|---|---|---|
| | | 123/406.2 |
| 2008/0258891 A1* | 10/2008 | Sato ........................ B62M 6/45 |
| | | 340/439 |

(Continued)

FOREIGN PATENT DOCUMENTS

| CN | 101678766 A | 3/2010 |
|---|---|---|
| CN | 102224527 A | 10/2011 |

(Continued)

OTHER PUBLICATIONS

Notice of Reasons for Refusal, Japanese Patent Application No. 2014-550720, Date of Mailing: Jun. 7, 2016, 19 pages.

(Continued)

*Primary Examiner* — Julie Lieu
(74) *Attorney, Agent, or Firm* — Myers Bigel, P.A.

(57) ABSTRACT

The present invention relates to a method of evaluating at least one operating parameter of a motor vehicle. A system variable relating to an operating parameter of the vehicle is measured. A look-up map (A; S; B) associated with the operating parameter is accessed. The look-up map (A; S; B) comprises of one or more sets of threshold values ($R_0$, $R_1$, $R_2$, $R_3$, $R_4$) and a comparison is made between the measured system variable and the threshold values ($R_0$, $R_1$, $R_2$, $R_3$, $R_4$). An economy rating ($E_1$, $E_2$, $E_3$, $E_4$, $E_5$) is obtained from the look-up map and an indicator output based on the economy rating ($E_1$, $E_2$, $E_3$, $E_4$, $E_5$) to provide the driver with feedback. The present invention also relates to a device for providing driver feedback.

18 Claims, 11 Drawing Sheets

(51) Int. Cl.
  *B60W 50/14* (2012.01)
  *B60R 16/023* (2006.01)
  *G09B 9/052* (2006.01)
  *B60W 50/00* (2006.01)

(52) U.S. Cl.
  CPC ......... *G07C 5/0808* (2013.01); *G07C 5/0816* (2013.01); *G09B 9/052* (2013.01); *B60K 2350/1092* (2013.01); *B60W 2050/0095* (2013.01); *B60W 2050/146* (2013.01); *B60W 2540/30* (2013.01)

(56) References Cited

U.S. PATENT DOCUMENTS

| | | | | |
|---|---|---|---|---|
| 2008/0319601 | A1* | 12/2008 | Komeda | B60W 40/10 701/99 |
| 2011/0029173 | A1* | 2/2011 | Hyde | G06Q 30/02 701/22 |
| 2011/0137508 | A1* | 6/2011 | Garcia Manchado | B60R 16/0236 701/31.4 |
| 2011/0148614 | A1 | 6/2011 | Wagner | |
| 2011/0166773 | A1 | 7/2011 | Raz et al. | |
| 2012/0221216 | A1* | 8/2012 | Chauncey | B60R 16/0236 701/51 |
| 2012/0253636 | A1* | 10/2012 | Jiang | F02D 13/0215 701/102 |
| 2013/0158838 | A1* | 6/2013 | Yorke | B60W 10/06 701/103 |

FOREIGN PATENT DOCUMENTS

| | | |
|---|---|---|
| CN | 102046427 B | 10/2013 |
| DE | 10 2008 041618 A1 | 3/2010 |
| DE | 10 2009 049367 A1 | 4/2011 |
| DE | 10 2009 054235 A1 | 5/2011 |
| EP | 2 011 696 A1 | 1/2009 |
| EP | 2 028 058 A2 | 12/2010 |
| JP | 2000-247162 A | 9/2000 |
| JP | 2008-254529 A | 10/2008 |

OTHER PUBLICATIONS

Notification of the First Office Action, Chinese Patent Application No. 201380012527.X, Jan. 28, 2016, English Translation, 8 pages.

* cited by examiner

FIG. 6

METHOD AND DEVICE FOR PROVIDING DRIVER FEEDBACK

RELATED APPLICATIONS

This application is a 35 U.S.C. § 371 national stage application of PCT Application No. PCT/EP2013/050218, filed on Jan. 8, 2013, which claims priority from Great Britain Patent Application No. 1200283.8, filed Jan. 9, 2012, the contents of which are incorporated herein by reference in their entireties. The above-referenced PCT International Application was published in the English language as International Publication No. WO 2013/104621 A2 on Jul. 18, 2013.

TECHNICAL FIELD

The present invention relates to a method of providing driver feedback based on an operating parameter of a motor vehicle. The invention also relates to a device for providing driver feedback. Aspects of the invention relate to a device, to a method and to a vehicle.

BACKGROUND OF THE INVENTION

It is known from US 2011/0148614 to generate a graphical display to visualise the current driving state of a motor vehicle. An economy index is generated for display by an algorithm based on accelerator pedal position, engine speed, vehicle speed and the engaged gear. The driving states which are optimised with respect to fuel consumption are displayed in shades of green and the non-optimised driving states are displayed in shades of yellow or red. Whilst the economy index provides a rating based on key vehicle parameters, the absence of a breakdown may make it difficult for driver to determine how they should alter their driving style to improve economy. Moreover, the dependence on several performance parameters increases the computational requirement.

DE 1 0201 001 8826 also discloses a driver feedback system based on different driving parameters, such as vehicle speed, throttle pedal position and brake pedal position. The actual driving parameter is displayed alongside an ideal desired value to allow the driver to adjust their driving style. There is no teaching as to how the ideal desired value is determined for any given operating conditions.

The present invention sets out to overcome or ameliorate at least some of the problems or shortcomings associated with prior art systems.

SUMMARY OF THE INVENTION

In one aspect, the present invention provides a method of evaluating at least one operating parameter of a motor vehicle and providing driver feedback, the method comprising:
measuring a first system variable related to a first operating parameter of the vehicle;
accessing a first look-up map associated with said first operating parameter, the first look-up map comprising one or more sets of first threshold values;
comparing the first system variable to said first threshold values and determining a first economy rating; and
outputting a first economy indicator based on said first economy rating.

The comparison of a measured system variable with a predefined threshold value(s) stored in a look-up map can provide an indication of vehicle fuel consumption. The first economy indicator can thereby provide feedback for the driver. The threshold values can be matched to certain operating conditions (such as vehicle speed), thereby improving the accuracy of the driver feedback. The output of said first economy indicator can thereby help the driver to adapt their driving style to improve fuel economy.

The first economy indicator can be generated substantially in real time to provide the driver with feedback as they drive the vehicle. Alternatively, or in addition, an average economy rating may be calculated, for example to output a first economy indicator averaged over a period of time or for a particular journey. The first economy indicator can be an audio or visual output. It is envisaged that the first economy indicator can take the form of an economy index or score, for example ranging from one (1) to five (5). A graphical representation of the first economy indicator may be provided.

The method may comprise selecting the first look-up map from a plurality of look-up maps, each of said plurality of look-up maps being associated with a respective vehicle operating mode. The method may comprise receiving vehicle mode data, determining a vehicle operating mode in dependence on said received vehicle mode data, and accessing the first look-up map from the plurality of look-up maps in dependence on the determined vehicle operating mode.

The first look-up map may comprise a plurality of sets of said first threshold values, each set relating to a particular vehicle operating condition. Each set of first threshold values may be associated with a predetermined range of vehicle speeds, and the method may comprise determining the speed of the motor vehicle, and selecting a set of first threshold values of the first look-up map for comparison with the first system variable in dependence on the determined vehicle speed.

The first threshold values may correspond to a steady-state measure of the first system variable of the vehicle; or said first threshold values may correspond to a measure of a rate of change of the first system variable of the vehicle.

The method may comprise selecting said first look-up map from a plurality of look-up maps associated with said first operating parameter, the selection being performed based on a property of the measured first system variable.

The method may comprise applying a modifier to said first economy rating to generate the first economy indicator. The modifier may be based on a second system variable related to a second operating parameter of the vehicle.

The at least one operating parameter may relate to one or more of the following: throttle position, engine speed, vehicle speed, and friction braking.

The method may comprise repeating the steps of measuring, accessing, comparing and outputting for at least one additional system variable relating to a different operating parameter of the vehicle. The method may comprise outputting at least one additional indicator based on an economy rating determined for said at least one additional system variable.

The look-up map can, for example, comprise (or consist of) a series of threshold ranges (or bands). The first economy rating can be based on the threshold range in which the measured first system variable lies. The first economy indicator can correspond to the first economy rating.

Optionally, a modifier can be applied to the first economy rating determined from the look-up map. The modifier can, for example, be based on a second system variable related to a second operating parameter of the vehicle. By way of example, the first system variable could be the engine speed and the modifier could be related to the vehicle speed to account for aerodynamic loading on the vehicle. The first economy rating could be amended to represent a lower economy if the vehicle speed is high. It is envisaged that the modifier could itself be derived from a separate look-up map.

The first look-up map can comprise (or consist of) a plurality of sets of said first threshold values. The set of threshold values to be used for analysis can be selected based on a vehicle operating parameter and/or a vehicle drive mode. For example, the set of first threshold values (against which the system variable is to be compared) can be selected based on one or more of the following: vehicle speed; engine speed; and engaged gear.

The first threshold values can correspond to a steady-state measurement of the first operating parameter of the vehicle. For example, the measured operating parameter can be averaged over a set period of time. Alternatively, the first threshold values can correspond to a measure of a rate of change of the first operating parameter of the vehicle. The resulting measured operating parameter is transient and can be positive (indicating an increase over the measurement period) or negative (indicating a decrease over the measurement period).

The method can further comprise normalizing the first system variable, for example by referencing the measured first system variable to an interpolation look-up map. The normalised first system variable can be independent of a particular vehicle/engine type or configuration. The normalised first system variable can be compared to said first threshold values in order to determine the first economy rating for said first system variable.

The method can further comprise the step of selecting the first look-up map from a plurality of look-up maps associated with said first operating parameter. This approach provides a dynamic selection of the look-up map to reflect current driving conditions/parameters. The selection can be performed based on a property (e.g. positive or negative) or value of the measured first system variable. For example, a steady-state look-up map can be selected when a steady-state measurement is taken. Equally, a positive or negative transient look-up map can be selected for measurement of respective positive and negative rates of change. Alternatively, a look-up map may be selected based on the current vehicle drive mode, or the current gear selected.

It will be understood that steps (a) to (d) of the present invention can be repeated for at least one additional system variable relating to a different operating parameter of the vehicle. At least one additional economy indicator can be output based on a second rating determined for said at least one additional system variable. Thus, it will be appreciated that a plurality of economy indicators can be output to provide ratings for different aspects of the vehicle operation. It is envisaged that three economy indicators (accelerator; combined speed and engine; and braking) would provide useful information for the driver.

The system variable(s) can be derived from a communication bus in the motor vehicle. The system variable(s) can, therefore, provide a direct measurement of the driver inputs to the motor vehicle. The measured system variable(s) can relate to one or more of the following: throttle pedal position and/or equivalent torque request, brake pedal position, engine speed, vehicle speed, acceleration or deceleration via engine braking, and friction braking.

The method according to the present invention can be inhibited under certain pre-defined conditions. For example, driver feedback can be inhibited when cruise control or hill descent control is engaged in the vehicle.

In a further aspect of the present invention, there is provided, a device for providing driver feedback in response to an evaluation of at least one operating parameter of a motor vehicle, the device comprising:
  a data bus for receiving sensor data corresponding to a first system variable related to a first operating parameter of the vehicle;
  a storage device storing a first look-up map associated with said first operating parameter, the first look-up map comprising at least one set of first threshold values;
  a processor configured to compare said sensor data with a set of said first threshold values and to determine a first economy rating; and
  an output device for outputting a first economy indicator based on said first economy rating.

The storage device may store a plurality of look-up maps, each of said plurality of look-up maps being associated with a respective vehicle operating mode, and the processor may be configured to select the first look-up map for comparison with said sensor data from said plurality of look-up maps.

The processor may be configured to receive vehicle operating mode data, to determine a vehicle operating mode in response to receiving said vehicle operating mode data, and to select the first look-up map from said plurality of look-up maps in dependence on the determined vehicle operating mode.

The first look-up map may comprise a plurality of sets of said first threshold values, each set relating to a particular vehicle operating condition. Each set of first threshold values may be associated with a predetermined range of vehicle speeds, and the processor may be configured to determine the speed of the motor vehicle, and to select a set of first threshold values of the first look-up map for comparison with the first system variable in dependence on the determined vehicle speed.

The first threshold values may correspond to a steady-state measure of the first system variable of the vehicle; or said first threshold values may correspond to a measure of a rate of change of the first system variable of the vehicle.

The data bus may be configured to receive sensor data relating to a plurality of operating parameters of the vehicle and the processor is configured to compare said sensor data relating to each operating parameter with a respective set of threshold values stored in said storage device to determine respective economy ratings.

The processor may be configured to apply a modifier to said first economy rating to generate the first economy indicator. The modifier may be based on a second system variable related to a second operating parameter of the vehicle.

The at least one operating parameter may relate to one or more of the following: throttle position, engine speed, vehicle speed, and friction braking.

In another aspect, the present invention relates to a vehicle having a device for providing driver feedback as described above.

The data bus can receive data from a variety of sensors on the vehicle. For example, the data bus can receive one or more of the following data types: engine speed data, vehicle speed data, brake switch status data, brake pressure (measured in the brake cylinder), virtual pedal position (derived from the accelerator pedal position), transmission status, transfer case status, terrain mode, terrain mode request signal, cruise control status, and hill descent status.

The processor can be configured to determine the first economy rating by accessing the first look-up map based on the first system variable. Optionally, the processor can be configured to apply a modifier to the first economy rating. The modifier can, for example, be based on a second system variable related to a second operating parameter of the vehicle. The processor may access a second look-up map to determine the modifier based on said second system variable.

The first threshold values can correspond to a steady-state measure of the first operating parameter of the vehicle. Alternatively, the first threshold values can correspond to a transient measurement of the first operating parameter of the vehicle (e.g. a measured rate of change of the first operating parameter).

The data bus can be configured to receive sensor data relating to a plurality of operating parameters of the vehicle. The processor can be configured to compare said sensor data relating to each operating parameter with a respective set of threshold data stored in said storage device to determine respective economy ratings. For example, the processor may selectively access one or more of the following look-up maps: steady state; positive transient; and negative transient.

The first look-up map can comprise sets of said first threshold values relating to a vehicle operating mode, such as: Hybrid, Cruise Control, Terrain Response, Dynamic, and Default.

The device can be configured to provide feedback on operating parameters relating to one or more of the following: throttle position, engine speed, vehicle speed, and friction braking.

The device can output the first economy indicator substantially in real time. In practice, an update cycle time of 500 ms has been found to be appropriate, but shorter or longer cycle times are also contemplated.

The output device can provide an audio and/or visual output for the driver. The output device can be a display screen, such as a liquid crystal display (LCD).

The device may also store a series of driving tips for educating the driver. The device may, for example, propose a particular tip in response to an economy rating determined for an operating parameter of the vehicle. The driving tips may only be displayed for the driver when the vehicle is stationary or parked. However, the driving tips could be displayed for a passenger, for example via a twin-view display, while the vehicle is being driven.

The method/device described herein can employ one or more system variables, for example associated with throttle, speed and braking, to evaluate the steady-state and/or transient state conditions. One or more look-up maps define threshold values for each system variable to enable feedback scores to be output for different vehicle speeds and states (for example hybrid, cruise control, terrain response, dynamic mode and default). The method/device can determine the feedback scores for each system variable over an appropriate time period, for example 500 ms.

Additionally, the method/device can comprise logic to consider the increasing effect of aerodynamic resistance on fuel economy with increasing speed. This can be incorporated into the feedback score output for the driver. To provide representative average trip feedback scores over a wide range of conditions, the method/device can place different levels of importance on the instantaneous feedback scores. To provide a global single summary feedback score, the method/device can place different levels of importance on the system variables to give adequate consideration to the parameters that have the most significant influence on real-world fuel economy. Another set of look up tables can define the different weightings to be used for each parameter: Accelerator, Speed & Engine, or Brake.

The method(s) described herein can be machine-implemented. The method described herein can be implemented on a computational device comprising one or more processors, such as an electronic microprocessor. The processor(s) can be configured to perform computational instructions stored in memory or in a storage device. The device described herein can comprise one or more processors configured to perform computational instructions.

In a further aspect the present invention relates to a computer system comprising: programmable circuitry; and software encoded on at least one computer-readable medium to program the programmable circuitry to implement the method described herein.

According to a still further aspect the present invention relates to one or more computer-readable media having computer-readable instructions thereon which, when executed by a computer, cause the computer to perform all the steps of the method(s) described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

A driving evaluation system 1 according to an embodiment of the present invention will be described with reference to FIGS. 1 to 6. In use, the evaluation system 1 monitors the operating parameters of a motor vehicle having an internal combustion engine. The evaluation system 1 provides a driver with real-time feedback on the impact of their driving on fuel economy.

In the present embodiment, the driving evaluation system 1 analyses the vehicle operating parameters of Accelerator (A), Speed & Engine (S) and Braking (B), where each operating parameter relates to an aspect of vehicle operation over which the driver has some measure of control. The Accelerator (A) relates to a driver's actuation of the throttle pedal and is determined as a percentage (%) based on a torque request map. The Speed & Engine (S) relates to engine speed and is measured as revolutions per minute (rpm) or vehicle acceleration measured as a rate (vehicle speed delta/time period). The Braking (B) is related to the actuation of the brake pedal and is measured as a pressure (bar) in the master brake cylinder or as a deceleration rate (vehicle speed delta/time period) resulting from application of brake pressure.

Figure 1:
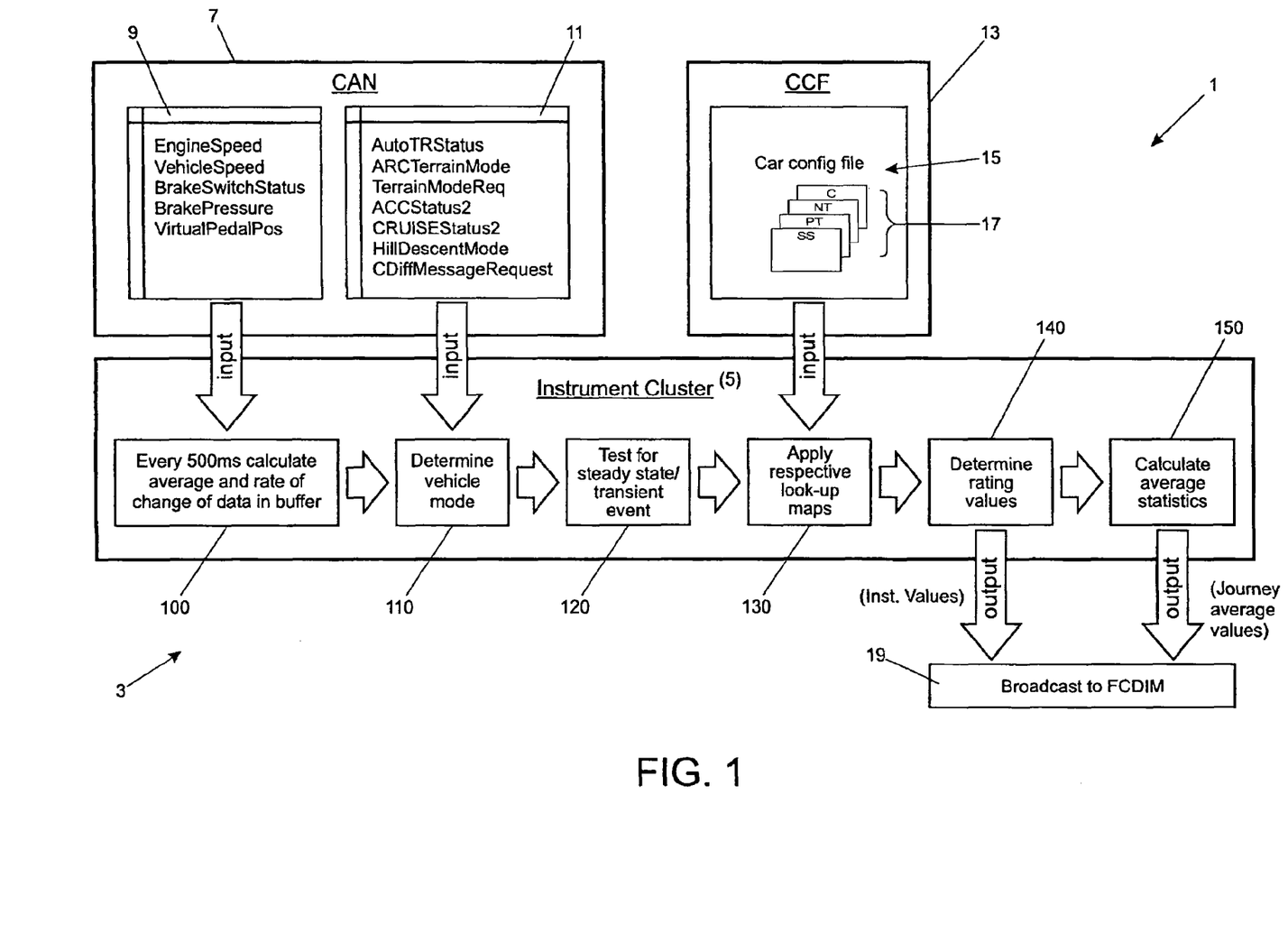
FIG. 1 shows a schematic overview of a driving evaluation system according to an embodiment of the present invention.

A schematic overview of the evaluation system 1 is shown in FIG. 1. The evaluation system 1 is implemented in a processor 3 provided in the instrument cluster 5. The processor 3 is connected to a CAN bus 7 which provides vehicle operating data 9 and vehicle mode data 11. The processor 3 is also connected to a storage device 13, such as read only memory (ROM), which stores a car configuration file (CCF) 15 consisting of a set of look-up maps 17.

The vehicle operating data 9 comprises system variables including engine speed (EngineSpeed), vehicle speed (VehicleSpeed), acceleration and deceleration rates (vehicle speed delta/time period), brake switch status (BrakeSwitchStatus), brake pressure (BrakePressure) and equivalent throttle pedal position (TM_PedalPos). The system variables are derived directly or indirectly from measurements taken by vehicle sensors. By way of example, the throttle pedal position is determined from a torque request map; and the brake pedal position (BrakePressure) is derived from the pressure in a master brake cylinder.

The vehicle mode data 11 comprises the terrain mode (ARCTerrainMode), requested terrain mode (TerrainModeReq), adaptive cruise control status in follow mode (ACCStatus2), cruise control status (CRUISEStatus2), hill descent mode status (HillDescentMode) and low range status (CDiffMessageRequest). The cruise control systems can be in 'Off', 'Override' or 'Stand-by' mode; and the low drive range can be engaged or disengaged. The evaluation system 1 can be disabled or inhibited under certain driving modes, for example when cruise control is engaged or the low drive range is selected.

The processor 3 interrogates the CAN bus 7 every 500 ms to obtain the current vehicle operating data 9. As illustrated by STEP 100, the processor 3 calculates the average value of each of the measured system variables during that 500 ms period. In addition, the processor 3 calculates the rate of change for each system variable during that time interval to provide a transient measurement. The rate of change can, for example, be determined as a percentage change per second (%/s); a rate of change of vehicle speed (kph/s); and pressure change per second (bar/s). The average data and the rate of change data are held in a buffer. In the present embodiment, the system variables for engine speed (EngineSpeed), acceleration rate (vehicle speed/time), vehicle speed (VehicleSpeed), throttle pedal position (TMPedalPos), brake status (BrakeSwitchStatus) and brake pedal position (VirtualPedalPos) or deceleration rate (vehicle speed/time) are analysed.

The current operating mode(s) of the vehicle can then be determined by accessing the vehicle mode data 11 provided on the CAN bus 7 (STEP 110). The processor 3 can determine which drive mode is currently selected (for example Park, Neutral, Drive, Sport). Also, the processor 3 can check if a terrain mode has been selected; or if cruise control/hill descent is engaged.

The processor 3 then checks for a steady state or transient event (STEP 120). This test determines whether the average or rate of change look-up maps (calculated at STEP 100) should be used in subsequent processing steps. Transient maps would be selected based on exceeding a specified constant related to the system variable in question, e.g. transient maps could be selected if acceleration rates are above a particular predefined value.

Figure 2:
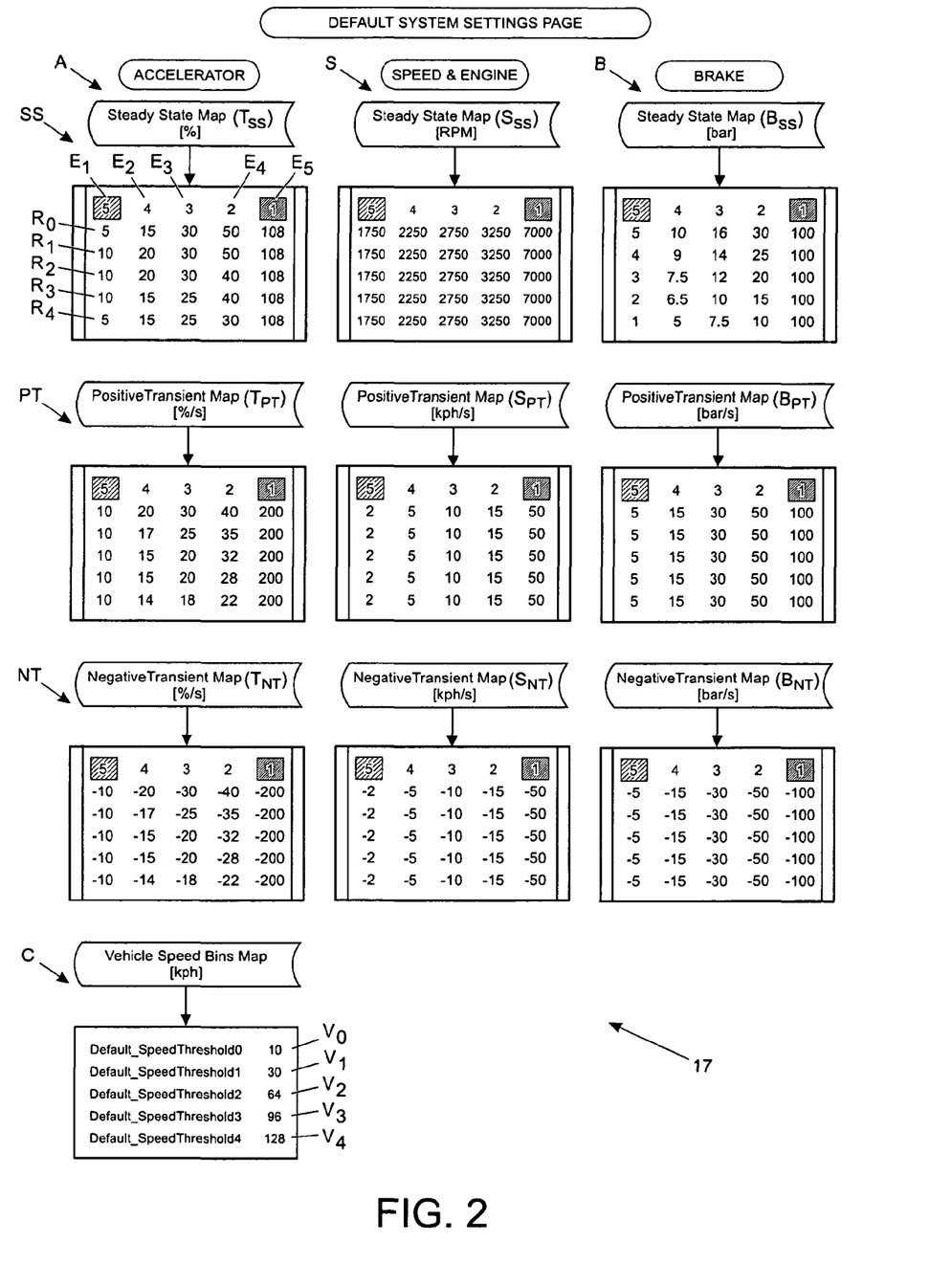
FIG. 2 shows sample look-up maps to be accessed by the evaluation system according to an embodiment of the present invention.

The processor 3 then accesses the CFF 15 to select a look-up map 17 associated with each of the operating parameters to be analysed (STEP 130). As illustrated in FIG. 2, a steady state map (SS), a positive transient map (PT) and a negative transient map (NT) are stored in the CFF 15 for the three operating parameters. The appropriate steady state or transient look-up map 17 is selected in response to the outcome of the steady state/transient test (STEP 120). In addition, a calibration map (C) is stored on the CFF 15 defining threshold values for the vehicle speed.

The look-up maps 17 each contain threshold values associated with a series of five economy ratings ($E_1$, $E_2$, $E_3$, $E_4$, $E_5$). The first economy rating ($E_1$) corresponds to a score of one (1) and represents a less efficient driving style (i.e. likely resulting in a higher fuel consumption). The fifth economy rating ($E_5$) corresponds to a score of five (5) and represents more efficient driving style (i.e. likely resulting in a lower fuel consumption). The intermediate economy ratings ($E_2$, $E_3$, $E_4$) provide a progressive scale between the first and fifth economy ratings ($E_1$, $E_5$) When displayed, the first economy rating ($E_1$) is coloured red; the second, third and fourth economy ratings ($E_2$, $E_3$, $E_4$) are coloured orange; and the fifth economy rating ($E_5$) is coloured green.

Within each look-up map 17, there are five sets of threshold values (illustrated as rows $R_0$, $R_1$, $R_2$, $R_3$, $R_4$ in FIG. 2) and the selection of the appropriate set of threshold values is determined by the calibration map (C). The calibration map (C) contains threshold values ($V_0$, $V_1$, $V_2$, $V_3$, $V_4$) for the vehicle speed (Default_SpeedThreshold0 to Default_SpeedThreshold4) and a check is performed to determine which set of threshold values ($R_0$, $R_1$, $R_2$, $R_3$, $R_4$) should be used for analysis. In particular, the set of threshold values ($R_0$, $R_1$, $R_2$, $R_3$, $R_4$) in the look-up map 17 is selected to correspond to the threshold value ($V_0$, $V_1$, $V_2$, $V_3$, $V_4$) identified in the calibration map (C) for the measured vehicle speed. For example, if the vehicle speed lies in the second threshold range ($V_1$) in the calibration map (C), the second set of threshold values ($R_1$) in the look-up map(s) is used for analysis. A change in vehicle speed may result in a different set of threshold values ($R_0$, $R_1$, $R_2$, $R_3$, $R_4$) being selected.

Once the appropriate set of threshold values ($R_0$, $R_1$, $R_2$, $R_3$, $R_4$) has been determined with reference to the calibration map (C), a comparison is made of the respective system variables obtained from the CAN bus 7 to the look-up maps for Accelerator (A), Speed & Engine (S) and Braking (B). The comparison is performed against the set of threshold values ($R_0$, $R_1$, $R_2$, $R_3$, $R_4$) selected based on the comparison in the calibration map (C). The economy rating ($E_1$, $E_2$, $E_3$, $E_4$, $E_5$) is determined from this comparison (STEP 140). An economy indicator based on the economy rating ($E_1$, $E_2$, $E_3$, $E_4$, $E_5$) is output in real-time to a display module 19 to provide driver feedback. In the present embodiment, the economy indicator corresponds to the economy rating ($E_1$, $E_2$, $E_3$, $E_4$, $E_5$).

The economy rating ($E_1$, $E_2$, $E_3$, $E_4$, $E_5$) is stored in a buffer to enable an average rating to be calculated for a particular journey (STEP 150). The average rating can be output to the display module 19 once the journey has been completed. The ratings may be stored for future reference, for example to provide an historical record.

Figure 3A:
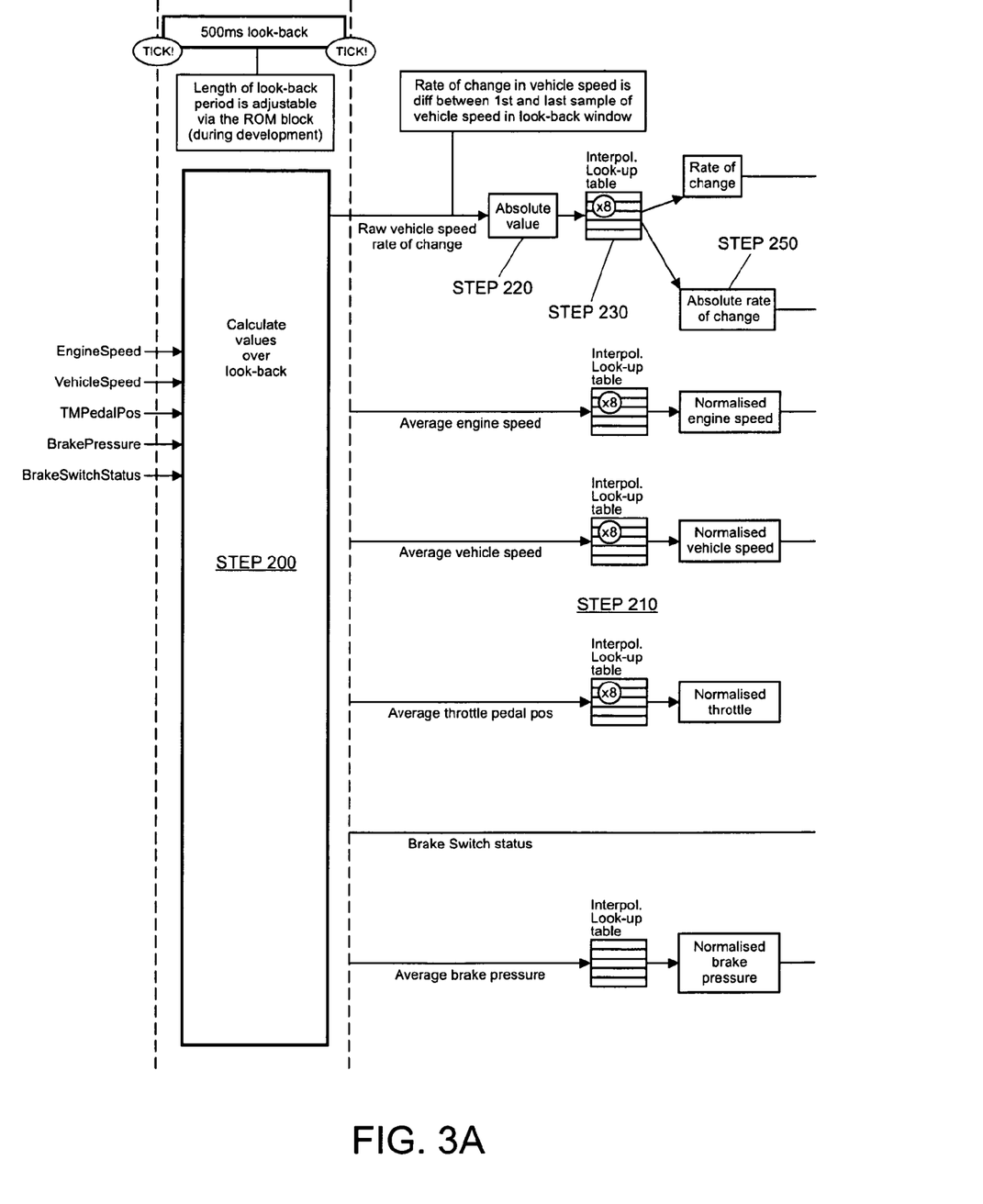
FIGS. 3A to 3E show a flow chart for implementing the evaluation system according to an embodiment of the present invention.

A flow diagram illustrating the processing steps in the evaluating system 1 is shown in FIGS. 3A to 3E. As shown in FIG. 3A, the system variables for engine speed (EngineSpeed), vehicle speed (VehicleSpeed), throttle pedal position (TMPedalPos), brake status (BrakeSwitchStatus) and brake pedal position (VirtualPedalPos) are averaged over the measurement period of 500 ms (STEP 200). The brake status (BrakeSwitchStatus) indicates whether or not the parking brake has been applied.

The averaged data for engine speed, vehicle speed, throttle pedal position and brake pedal position is output to respective interpolation look-up tables to generate normalised data (STEP 210). The subsequent evaluating steps can be performed irrespective of the vehicle/engine type or configuration.

A rate of change of the vehicle speed (VehicleSpeed) is calculated by comparing the current vehicle speed data with the previous vehicle speed data (STEP 220). The rate of change in vehicle speed is also passed to an interpolation look-up table and relative and absolute rate of change values output (STEP 230). The relative value for the rate of change is categorised as being "Steady", "Positive" or "Negative" (STEP 240); and the absolute value for the rate of change is forwarded for further evaluation (STEP 250).

Figure 3B:
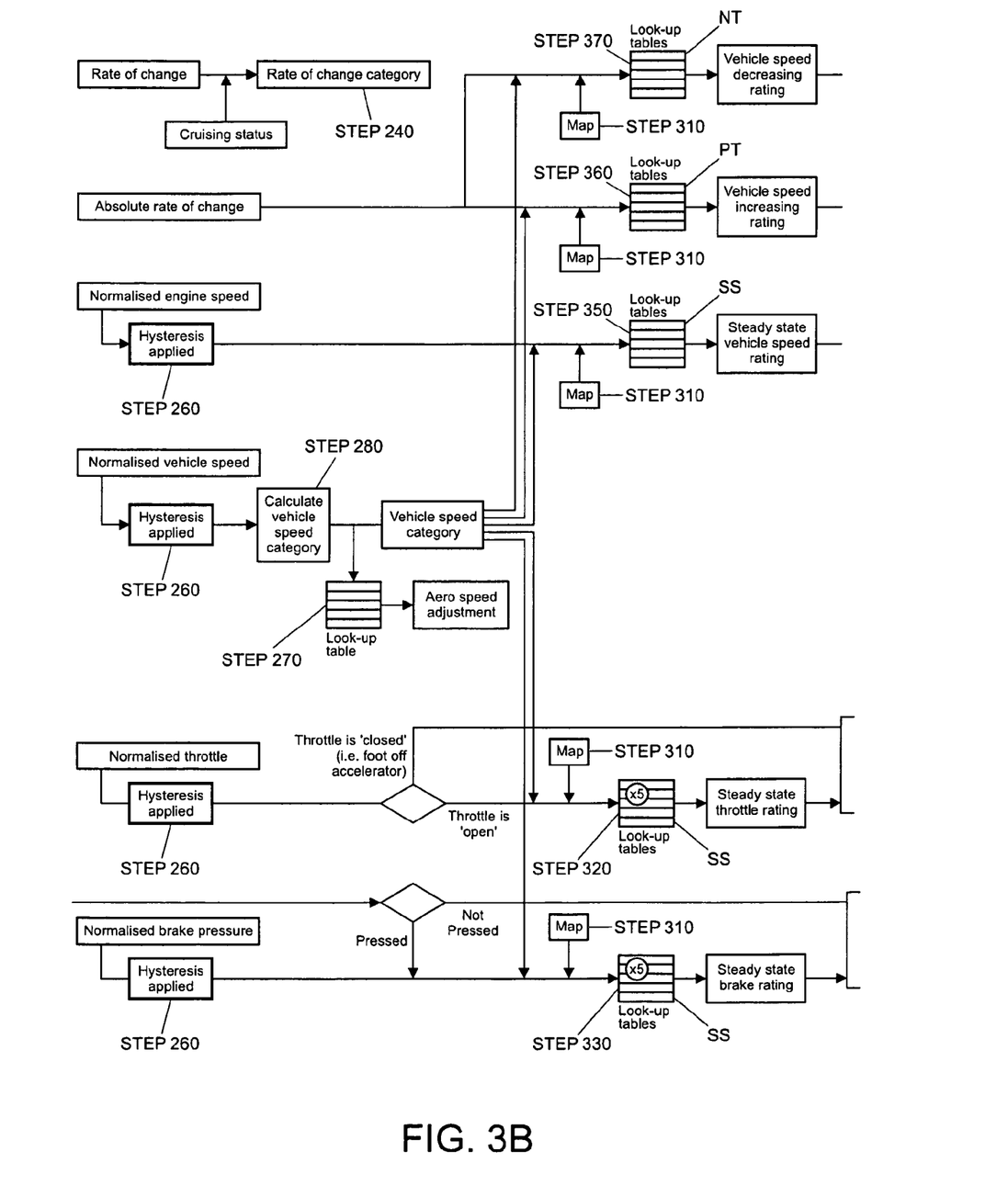

To remove signal noise, hysteresis is performed on the normalised data for the engine speed, vehicle speed, throttle position and brake pressure (STEP 260). As illustrated in FIG. 3B, the normalised vehicle speed data is applied to a speed look-up table to generate an aero speed adjustment value (STEP 270). The aero speed adjustment value is a modifier which can be applied to the economy ratings to reflect increased aerodynamic drag relating to the vehicle speed.

Independent of the aero speed adjustment, the normalised vehicle speed data is categorised (STEP 280) and the vehicle speed category data output applied as a modifier to the other data channels. Specifically, the vehicle speed category data is applied to the normalised data for the rate of change in vehicle speed, the engine speed, the throttle position and the brake pedal position.

Figure 3C:
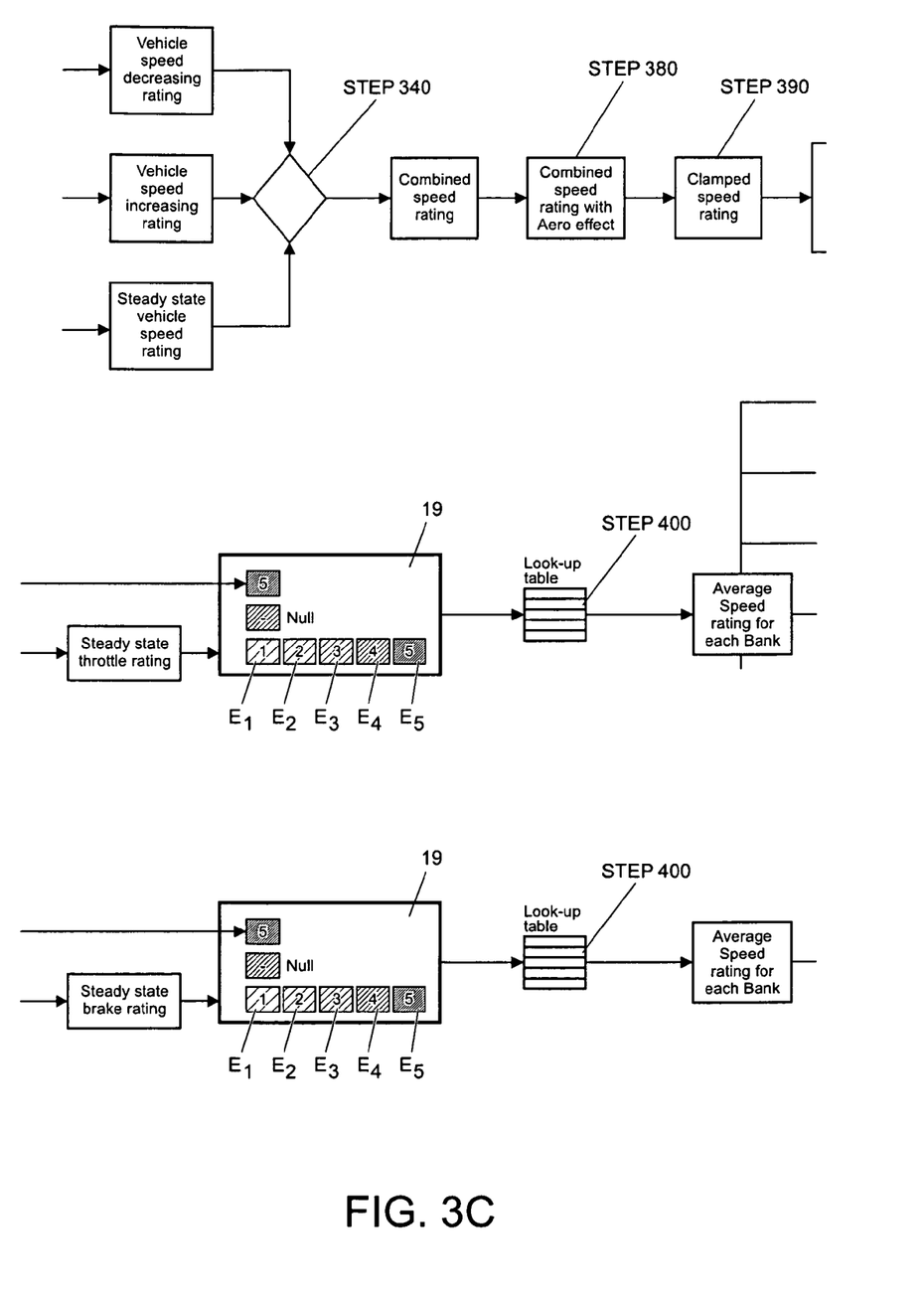
Figure 3D:
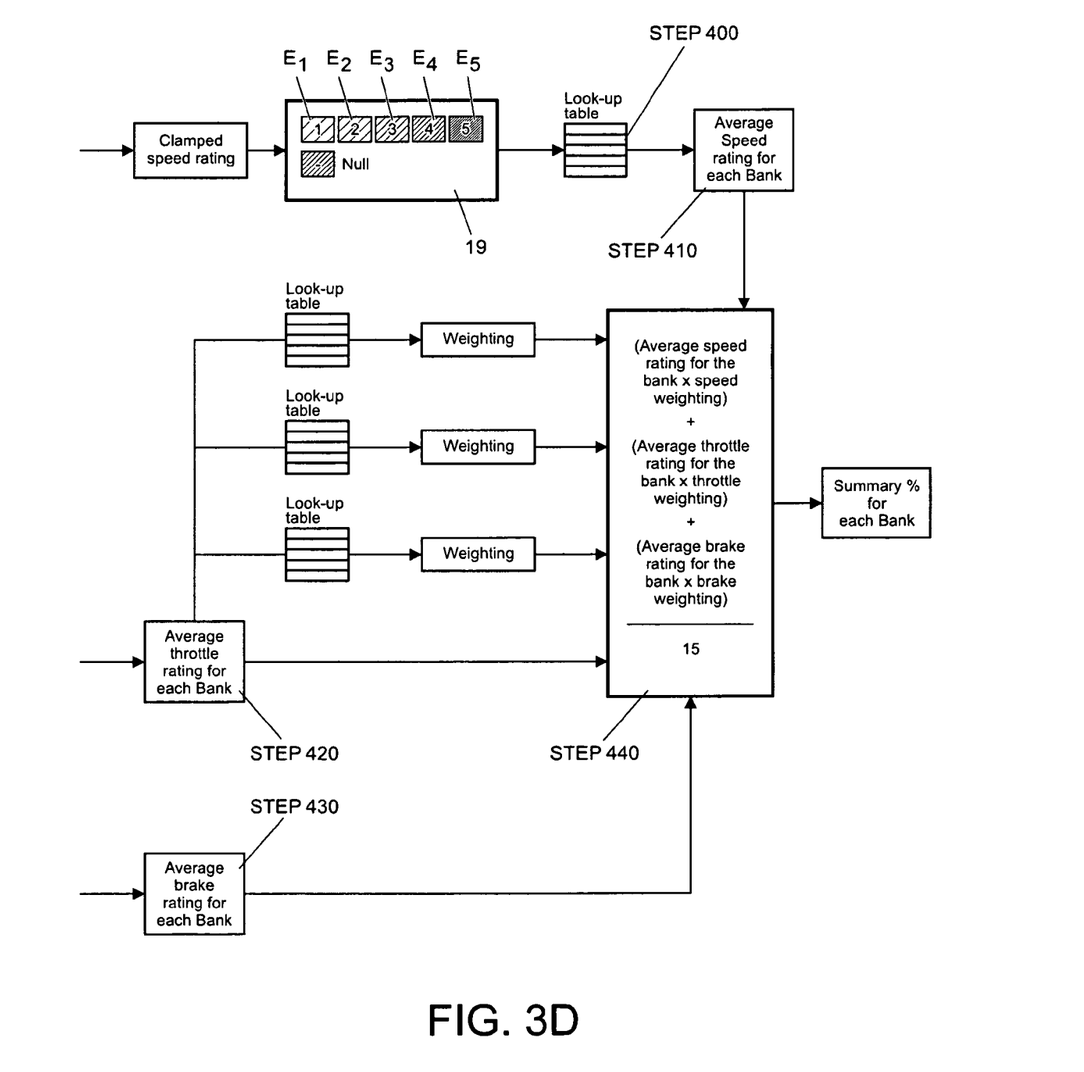
Figure 3E:
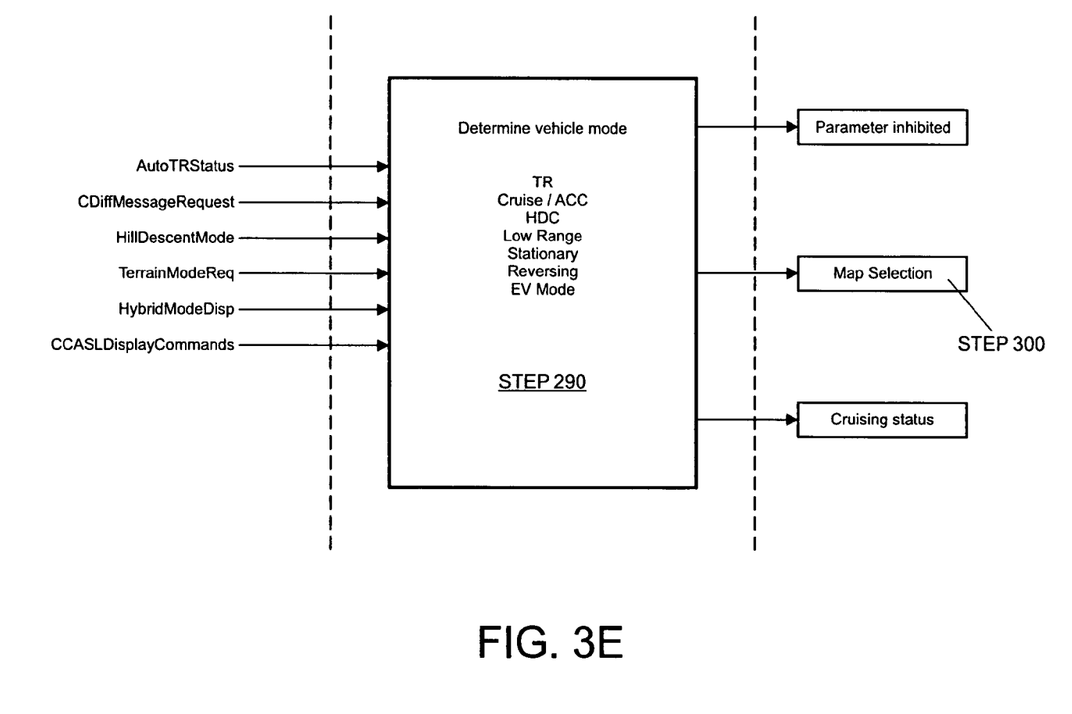

As illustrated in FIG. 3E, the vehicle operating settings are analysed separately to generate a vehicle map selection (STEP 290). The map selection comprises "Default", "Dynamic", "Hybrid", or "Transfer" modes (STEP 300). The resulting map data is applied as a modifier to the normalised data for the rate of change of vehicle speed, the engine speed, the throttle position and the brake pedal position.

The normalised data, modified by the vehicle speed category and vehicle map data (STEP 310), for the throttle (STEP 320) and the brake pressure (STEP 330) is applied to respective look-up tables to generate the respective economy ratings ($E_1$, $E_2$, $E_3$, $E_4$, $E_5$). The appropriate look-up table can be selected based on the measured parameters, for example separate look-up tables can be referenced for positive transient (PT), negative transient (NT) or steady-state (SS) conditions. As illustrated in FIGS. 3C and 3D, the economy rating ($E_1$, $E_2$, $E_3$, $E_4$, $E_5$) is output to the display module 19 to provide driver feedback.

In the case of the vehicle speed data, a combined vehicle speed data is determined by combining the rate of change in vehicle speed with the steady state vehicle speed (STEP 340). To help reflect excessive acceleration, the economy rating ($E_1$, $E_2$, $E_3$, $E_4$, $E_5$) is determined based on the lower rating of the STEADY rating (i.e. the steady-state look-up map—STEP 350) or INCREASING rating (i.e. the positive transient look-up map—STEP 360) while accelerating. Conversely, to reflect efficient deceleration, the economy rating ($E_1$, $E_2$, $E_3$, $E_4$, $E_5$) is based on the higher rating of the STEADY rating (i.e. the steady-state look-up map—STEP 350) or DECREASING rating (i.e. the negative transient look-up map—STEP 370) while decelerating.

Moreover, the aero speed adjustment value is applied to the combined vehicle speed data to modify the economy rating to account for aerodynamic drag (STEP 380). The rating for the vehicle speed is "clamped" or limited to prevent it falling below a minimum economy rating (STEP 390).

The evaluating system 1 also generates a summary economy rating for each of the Accelerator (A), Speed & Engine (S) and Braking (B). A weighting look-up map is referenced (STEP 400) to provide a weighting for the economy ratings ($E_1$, $E_2$, $E_3$, $E_4$, $E_5$) determined for each of the Accelerator (A), Speed & Engine (S) and Braking (B). To determine the average economy rating for the Accelerator (A), the average speed rating is multiplied by the speed weighting determined from the weighting look-up map (STEP 410). The average economy rating for the Speed & Engine (S) is determined by multiplying the average throttle rating and the throttle weighting determined from the weighting look-up map (STEP 420). The average economy rating for the Braking (B) is calculated by multiplying the average brake rating with the brake weighting determined from the weighting look-up map (STEP 430). A combined summary is generated by summing the summary economy ratings determined for each of the Accelerator (A), Speed & Engine (S) and Braking (B) (STEP 440).

The combined summary can be output as an efficiency score, for example as a percentage.

The summary economy ratings and/or the average efficiency score can be generated for a particular journey or over a user-defined period of time. The resulting trip information can cover multiple journeys over an extended time period (e.g. days, weeks, months).

Figure 4:
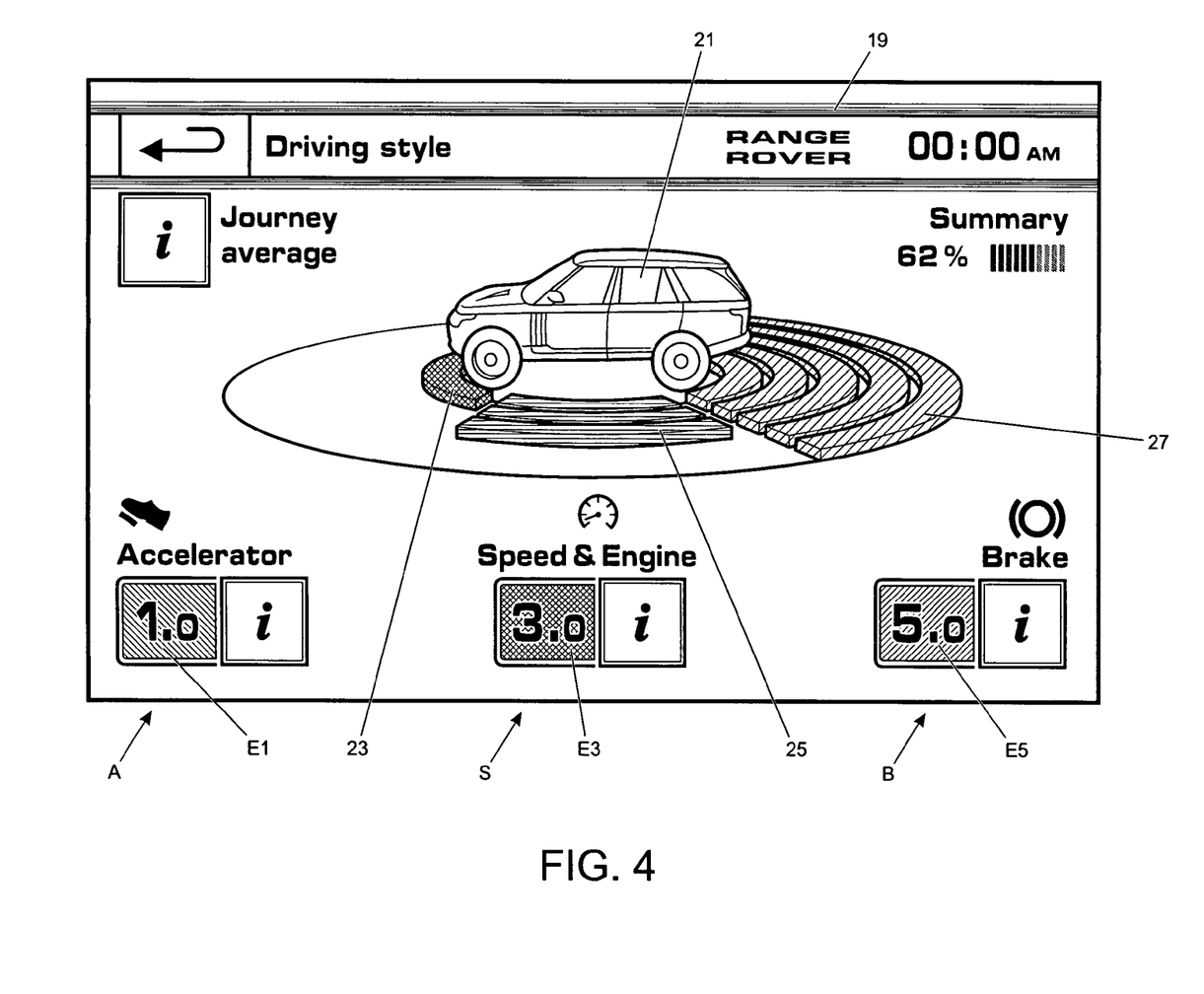
FIG. 4 shows a graphical representation of the real-time feedback display.

An exemplary graphical real-time display on the display module 19 is illustrated in FIG. 4. The economy ratings ($E_1$, $E_2$, $E_3$, $E_4$, $E_5$) for the operating parameters Accelerator (A), Speed & Engine (S) and Braking (B) are displayed as numerical values from 1 to 5. In addition, the economy ratings ($E_1$, $E_2$, $E_3$, $E_4$, $E_5$) are displayed as concentric segments in relation to a graphical representation of the vehicle 21. The Accelerator (A) is represented by first segments 23 projecting in front of the vehicle 21; the Speed & Engine (S) is represented by second segments 25 extending radially outwardly to a side of the vehicle 21; and the Braking (B) by third segments 27 extending to the rear of the vehicle 21. The number of the segments displayed corresponds to the economy rating ($E_1$, $E_2$, $E_3$, $E_4$, $E_5$) determined for that operating parameter. The display module 19 provides an intuitive indication of the economy rating of the operating parameters which can be readily interpreted by the driver.

Figure 5A:
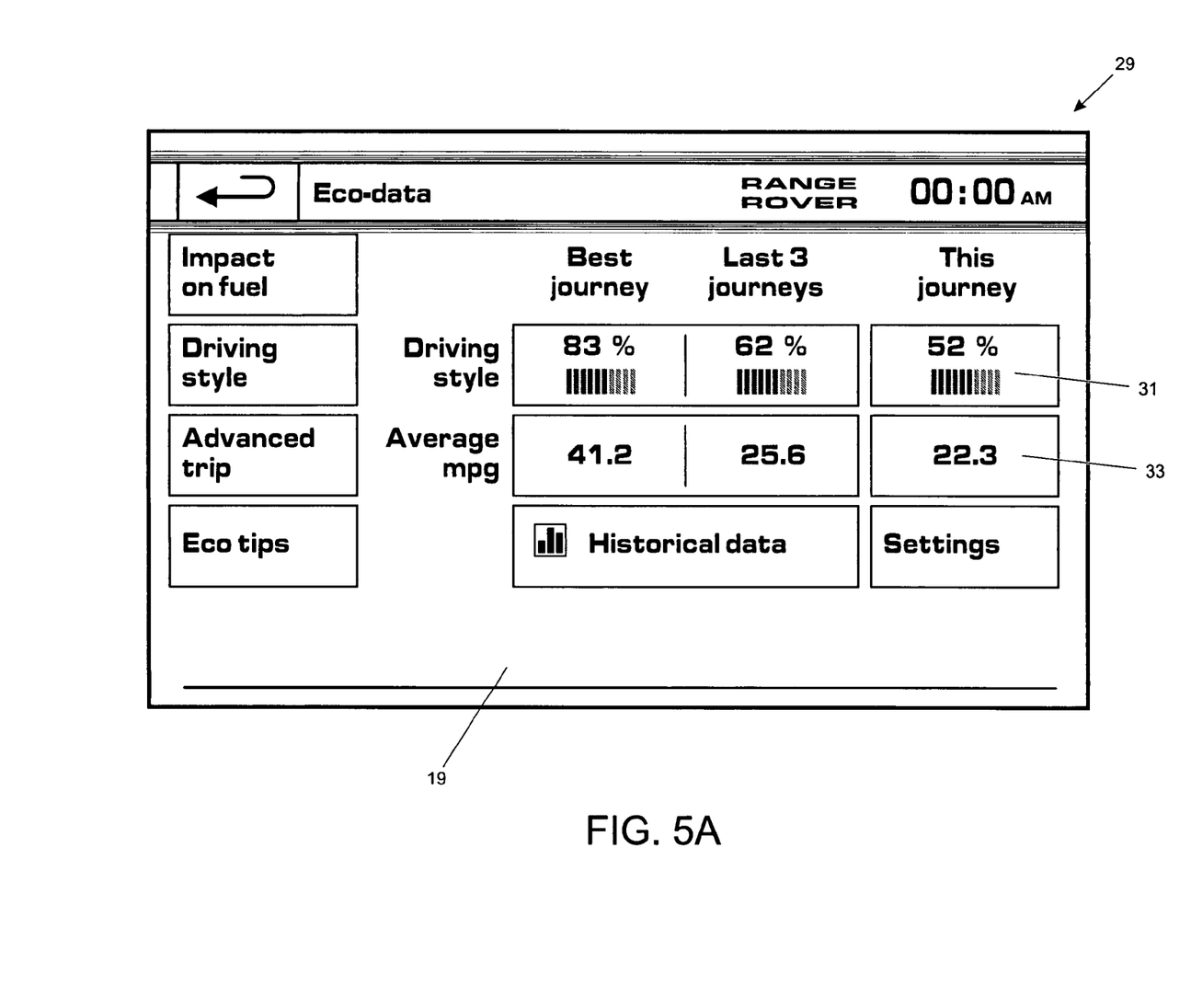
FIGS. 5A and 5B show graphical representations of the advanced trip and historical summary displays.

An advanced trip summary 29 can be displayed to provide details of a current journey in the vehicle. As illustrated in FIG. 5A, the trip summary 29 provides an overall economy rating 31 as a percentage, and an average fuel consumption (miles travelled per gallon of fuel—mpg) 33 for the current journey. The trip summary 29 also provides an average of the overall rating and miles travelled per gallon of fuel (mpg) for the last three journeys in the vehicle. The highest overall economy rating and miles per gallon completed in the vehicle are also provided for comparison.

Figure 5B:
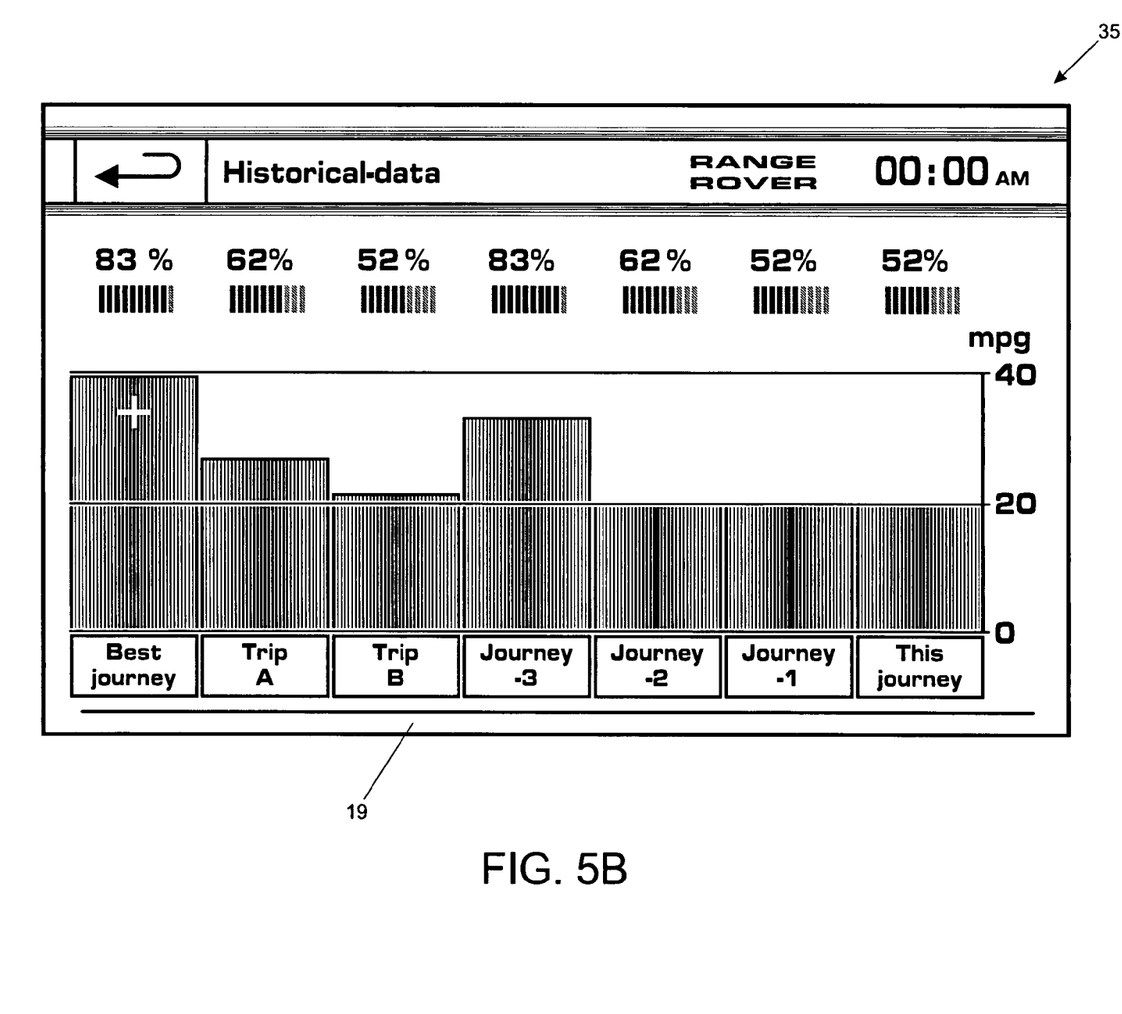

An historical data summary 35 can also be displayed, as illustrated in FIG. 5B. The historical data summary 35 comprises an overall economy rating along with an average miles per gallon (mpg) for the journey. The historical data is displayed for the current journey and the preceding three journeys. To allow on-going comparisons, for example for a particular journey, the driver can also store summary data for a user-defined period of time, for example to cover multiple journeys over an extended time period (e.g. days, weeks, months). This summary data can be stored as separate trips (Trip A and Trip B). A summary of the best journey performance (i.e. highest economy rating and fuel economy) is also displayed for future reference.

Figure 6:
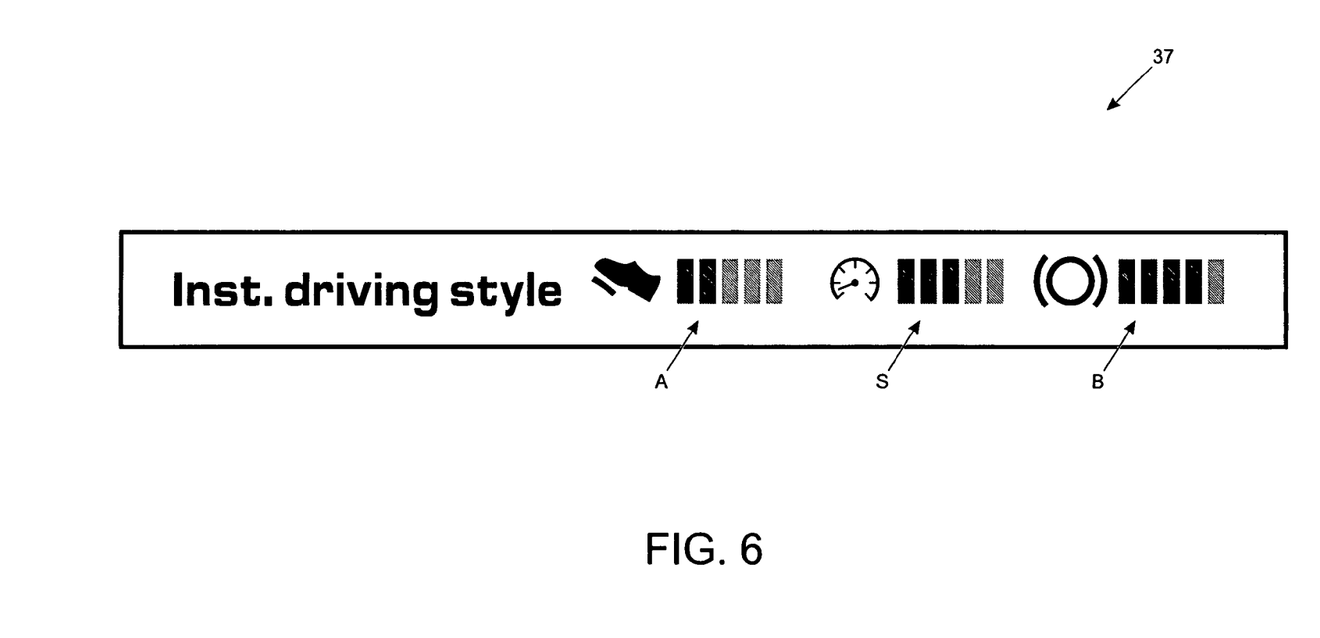
FIG. 6 shows a graphical representation of a real-time driving style summary for display in an instrument cluster.

As shown in FIG. 6, a real-time driving style summary 37 can be displayed for the Accelerator (A), Speed & Engine (S) or Braking (B). The driving style summary 37 is a simplified version of the real-time display and can be displayed in an instrument cluster rather than on the display module 19. The driving style summary 37 comprises bar charts for the Accelerator (A), Speed & Engine (S) or Braking (B). The bar charts each comprise five bars to represent the economy rating ($E_1$, $E_2$, $E_3$, $E_4$, $E_5$) determined for that operating parameter.

The driving evaluation system 1 according to the present invention can be modified in various respects.

First, the economy rating for the Speed (S) can be determined based on engine speed (RPM) and/or vehicle acceleration (kph/s). A steady state look-up map ($S_{SS}$) is accessed for engine speed to determine a first economy rating ($E_1$, $E_2$, $E_3$, $E_4$, $E_5$); and a transient look-up map ($S_{PT}$; $S_{NT}$) is accessed for vehicle acceleration to determine a second economy rating ($E_1$, $E_2$, $E_3$, $E_4$, $E_5$). The economy indicator output to the display 19 could be based on the lower of the first and second ratings ($E_1$, $E_2$, $E_3$, $E_4$, $E_5$).

Moreover, the economy rating ($E_1$, $E_2$, $E_3$, $E_4$, $E_5$) derived from the look-up maps may be modified, for example based on the vehicle speed. This could provide driver feedback to highlight a reduced efficiency resulting from increased aerodynamic drag as speed increases. It is envisaged that a modifier would be applied to the economy rating ($E_1$, $E_2$, $E_3$, $E_4$, $E_5$) determined for Speed (S) and the modified rating output for display. The modifier could be determined from a modifier look-up map containing a series of ranges with associated modifiers.

The economy rating ($E_1$, $E_2$, $E_3$, $E_4$, $E_5$) for the Brake (B) has been described with reference to the pressure in the master brake cylinder. Alternatively, or in addition, the rate of deceleration of the vehicle could be used to determine an economy rating ($E_1$, $E_2$, $E_3$, $E_4$, $E_5$). The use of the rate of deceleration would be preferable since it would not be dependent on vehicle type and would potentially require less calibration.

Operation of the driving evaluation system 1 may be inhibited when certain drive modes are engaged. For example, the driving evaluation system 1 can be inhibited when the cruise control is actively adjusting throttle/braking settings. However, the driving evaluation system 1 could operate once the cruise control determines that the vehicle has achieved the set speed, provided it is not in a vehicle-follow mode. The graphical display could be partially or completely obstructed, for example to show the economy rating greyed-out, when the driving evaluation system 1 is inhibited.

Similarly, the graphical display can be partially or completely obstructed if the driver is making a telephone call or reversing cameras have not been activated.

The driving evaluation system 1 can also contain a library of tips to promote more efficient driving. The tips could, for example, promote smooth acceleration and deceleration; and/or recommend vehicle servicing.

Various changes and modifications can be made to the system described herein without departing from the spirit and scope of the invention. The system could be modified to provide additional information to the driver, for example to provide gear shift recommendations to improve fuel consumption.

The invention has been described with reference to a motor vehicle having an internal combustion engine. However, it is envisaged that the system could also be implemented in a hybrid or electric vehicle, for example to provide feedback on battery usage and/or range calculations.

The invention claimed is:

1. A method of evaluating at least one operating parameter of a motor vehicle and providing driver feedback, the method comprising:
   measuring a first system variable related to a first operating parameter of the vehicle;
   accessing a first look-up map from a plurality of look-up maps, each of said plurality of look-up maps being associated with a respective vehicle operating mode and associated with said first operating parameter, the first look-up map comprising one or more sets of first threshold values;
   comparing the first system variable to said first threshold values and determining a first economy rating; and
   outputting a first economy indicator based on said first economy rating.

2. The method of claim 1, comprising receiving vehicle mode data, determining a vehicle operating mode in dependence on said received vehicle mode data, and accessing the first look-up map from the plurality of look-up maps in dependence on the determined vehicle operating mode.

3. The method of claim 1, wherein the first look-up map comprises a plurality of sets of said first threshold values, each set relating to a particular vehicle operating condition.

4. The method of claim 3, wherein each set of first threshold values is associated with a predetermined range of vehicle speeds, the method comprising determining a speed of the motor vehicle, and selecting a set of first threshold values of the first look-up map for comparison with the first system variable in dependence on the determined vehicle speed.

5. The method of claim 1, wherein said first threshold values correspond to a steady-state measure of the first system variable of the vehicle; or said first threshold values correspond to a measure of a rate of change of the first system variable of the vehicle.

6. The method of claim 1, comprising selecting said first look-up map from a plurality of look-up maps associated with said first operating parameter, the selection being performed based on a property of the measured first system variable.

7. The method of claim 1, comprising applying a modifier to said first economy rating to generate the first economy indicator.

8. The method of claim 1, comprising repeating the steps of measuring, accessing, comparing and outputting for at least one additional system variable relating to a different operating parameter of the vehicle.

9. The method of claim 8, comprising outputting at least one additional indicator based on an economy rating determined for said at least one additional system variable.

10. One or more non-transitory computer-readable media having computer-readable instructions thereon which, when executed by a computer, cause the computer to perform all the steps of the method of claim 1.

11. A system for providing driver feedback in response to an evaluation of at least one operating parameter of a motor vehicle, the system comprising:
- a data bus for receiving sensor data corresponding to a first system variable related to a first operating parameter of the vehicle;
- a storage device storing a first look-up map associated with said first operating parameter, the first look-up map comprising at least one set of first threshold values;
- a processor configured to compare said sensor data with a set of said first threshold values and to determine a first economy rating; and
- an output device for outputting a first economy indicator based on said first economy rating;
- wherein the storage device stores a plurality of look-up maps, each of said plurality of look-up maps being associated with a respective vehicle operating mode, the processor being configured to select the first look-up map for comparison with said sensor data from said plurality of look-up maps.

12. The system of claim 11, wherein the processor is configured to receive vehicle operating mode data, to determine a vehicle operating mode in response to receiving said vehicle operating mode data, and to select the first look-up map from said plurality of look-up maps in dependence on the determined vehicle operating mode.

13. The system of claim 11, wherein the first look-up map comprises a plurality of sets of said first threshold values, each set relating to a particular vehicle operating condition.

14. The system of claim 13, wherein each set of first threshold values is associated with a predetermined range of vehicle speeds, the processor being configured to determine a speed of the motor vehicle, and to select a set of first threshold values of the first look-up map for comparison with the first system variable in dependence on the determined vehicle speed.

15. The system of claim 11, wherein said first threshold values correspond to a steady-state measure of the first system variable of the vehicle; or said first threshold values correspond to a measure of a rate of change of the first system variable of the vehicle.

16. The system of claim 11, wherein said data bus is configured to receive sensor data relating to a plurality of operating parameters of the vehicle and the processor is configured to compare said sensor data relating to each operating parameter with a respective set of threshold values stored in said storage device to determine respective economy ratings.

17. The system of claim 11, wherein the processor is configured to apply a modifier to said first economy rating to generate the first economy indicator.

18. A vehicle having a system for providing driver feedback as claimed in claim 11.

* * * * *